United States Patent [19]

Turkumäki et al.

[11] Patent Number: 5,216,701
[45] Date of Patent: Jun. 1, 1993

[54] VARIABLE-SIZE CASSETTE HOLDER IN A MAMMOGRAPHY APPARATUS

[75] Inventors: Terho Turkumäki, Sipoo; Voitto Saarinen; Jorma Kuronen, both of Helsinki, all of Finland

[73] Assignee: Orion-Yhtyma Oy, Helsinki, Finland

[21] Appl. No.: 711,691

[22] Filed: Jun. 7, 1991

[51] Int. Cl.⁵ ............................................. G03B 42/02
[52] U.S. Cl. ...................................... 378/181; 378/37; 378/182
[58] Field of Search ............... 378/167, 169, 181, 182, 378/187, 177, 37

[56] References Cited

U.S. PATENT DOCUMENTS

| 4,416,020 | 11/1983 | Wagner et al. | 378/181 |
| 4,455,672 | 6/1984 | Hahn et al. | 378/181 |
| 4,538,293 | 8/1985 | Cutter | 378/181 |
| 4,894,854 | 1/1990 | Guba et al. | 378/181 |
| 4,989,227 | 1/1991 | Tirelli et al. | 378/181 |
| 5,148,466 | 9/1992 | Fajac | 378/181 |

Primary Examiner—David P. Porta
Assistant Examiner—Kim-Kwok Chu
Attorney, Agent, or Firm—Browdy & Neimark

[57] ABSTRACT

The invention relates to a cassette holder intended for a mammography apparatus, the holder being suitable for cassettes of different sizes and having means by which the holder can be widened or narrowed to a suitable size by the moving of a detachable cassette retainer (4, 4").

5 Claims, 3 Drawing Sheets

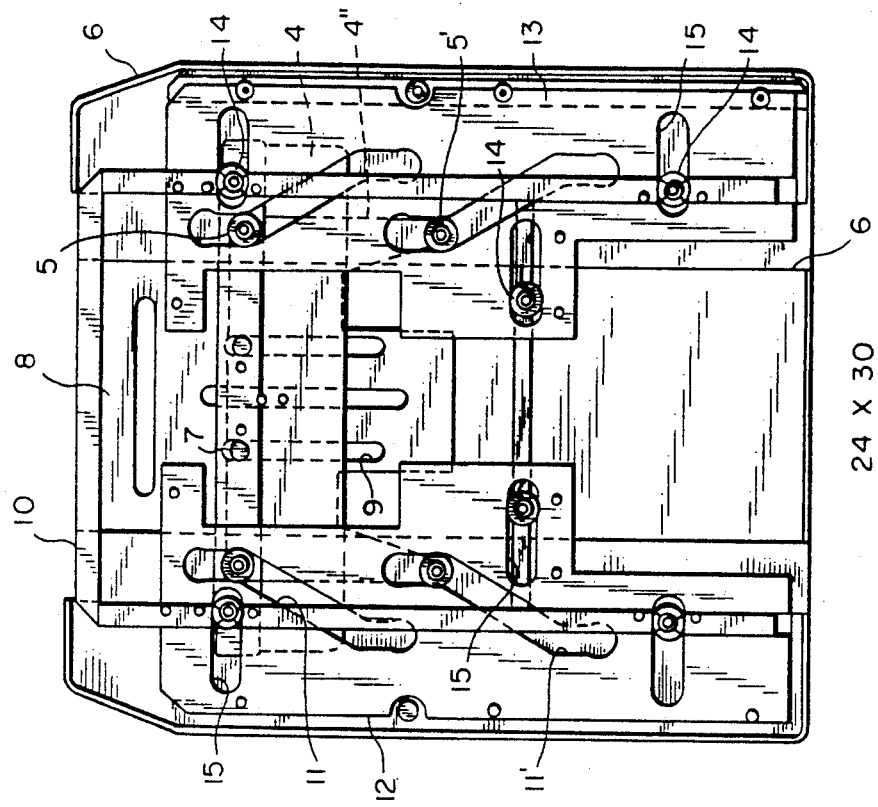
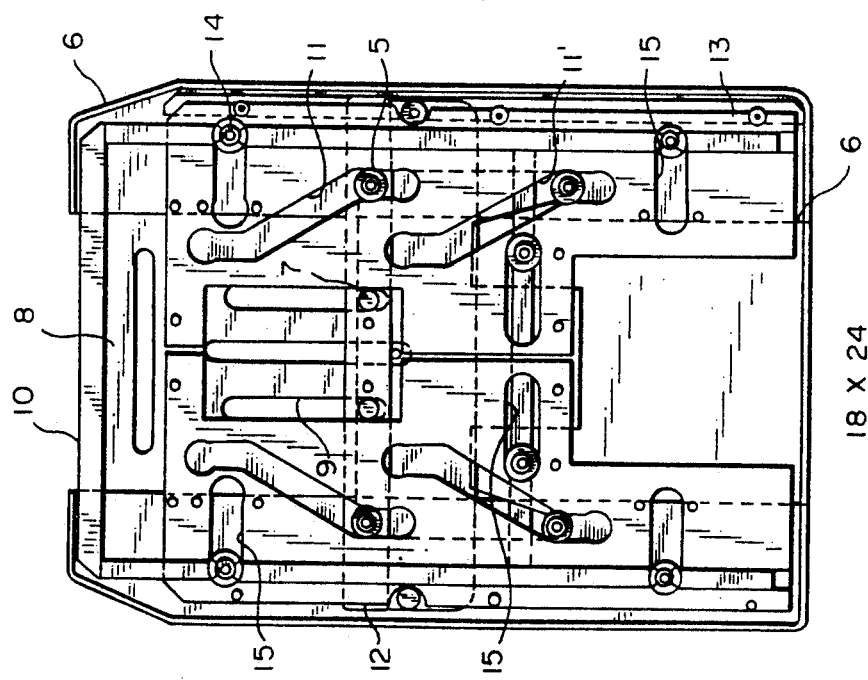

VARIABLE-SIZE CASSETTE HOLDER IN A MAMMOGRAPHY APPARATUS

FIELD OF THE INVENTION

The present invention relates to a cassette holder for use in a mammography apparatus, the size of which cassette holder can be changed easily.

SUMMARY OF THE INVENTION

The construction of a conventional mammography apparatus is shown in FIG. 1 cooperating with a portion of the cassette holder in accordance with the invention. In this apparatus the breast to be radiographed is pressed between a compression plate designed for mammography and the film cassette. X-radiation is emitted from an X-ray tube located above the compression plate, its radiation being filtered (for example 0.03 mm Mo) and well collimated, since the radiation field must not exceed the X-ray film except at that edge of the film which is towards the patient. On the other hand, the radiation field must not to a great extent remain short of the edge of the film, since in that case part of the mammary gland would be left unradiographed. Accordingly, the cassette holder is designed to permit the edge of the loaded film cassette towards the patient to be substantially in contact with the body of the patient during radiographing. The cassette is attached to a cassette table, across which there extends a layer of lead covering the whole area so that it will not allow penetration of, radiation.

PRIOR ART AND OBJECT OF THE INVENTIONS

There exist a plurality of cassette sizes, and thus also size requirements for the radiation field; field sizes of 18×24 cm and 24×30 cm are established sizes, but recently also other cassette sizes have appeared on the market. If it has been desired to change the cassette size in a present-day mammography apparatus, it has been necessary to replace the entire cassette table with one of different size. It is also prior known to place holders of different sizes at the opposite ends of a separate, swivelling arm and to change the table size by swivelling the arm through 180°. It has also been possible to add to the table separate adjustment pieces for different cassette sizes.

Changing the cassette size has thus previously been cumbersome, and possibly also time-consuming. An effort has been made to eliminate these disadvantages by the invention according to the application. The cassette table construction of the invention is such that, when the cassette size is being changed, the changing of the table size can be done rapidly by extending the cassette table to a different width. This is done according to the invention by moving the cassette retainer in either direction. The cassette table will after its extension retain all its properties: prevention of penetration of radiation, detection of the presence of a cassette in place, locking of the cassette, and a system for marking the film. It is another advantage of the invention that the cassette retainer can be detached easily, whereupon a movable Bucky grid can be pushed into its place on top of the table.

BRIEF DESCRIPTION OF THE DRAWINGS

The invention is described below in greater detail with the help of figures, wherein FIGS. 2A and 2B depicts a plan view of a cassette holder according to the invention, with FIG. 2A holding a 18×24 cassette and FIG. 2B holding a 24×30 cassette.

DETAILED DESCRIPTION OF PREFERRED EMBODIMENTS

Figure 1:
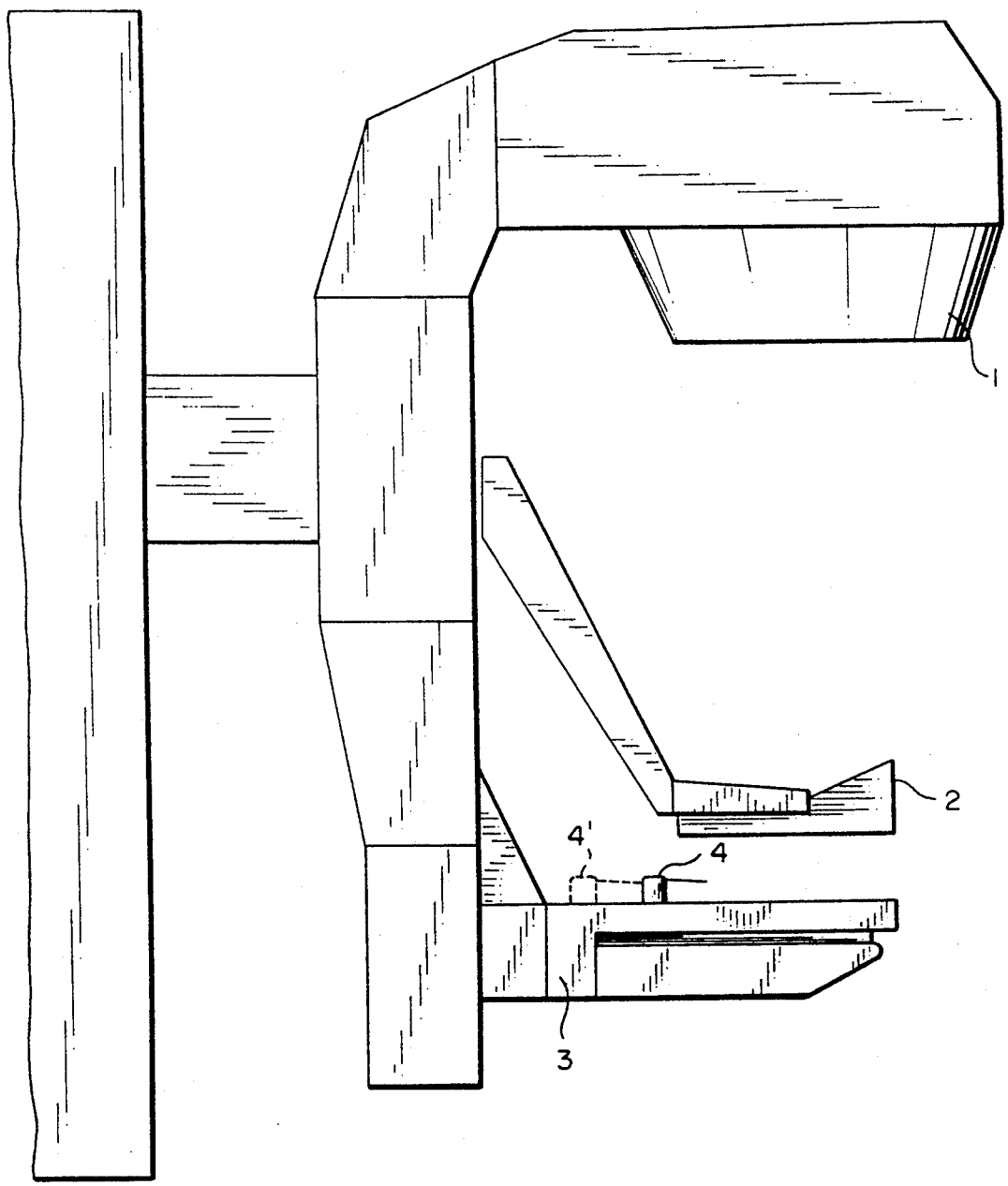
FIG. 1 depicts a side elevation of a conventional mammography apparatus with a portion of the cassette holder in accordance with the invention shown thereon.
Figure 3A:
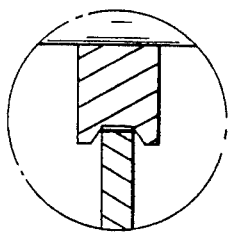
FIG. 3A depicts an exploded view of a corresponding portion shown on FIG. 3.

FIG. 1 shows a conventional mammography apparatus, having an X-ray tube 1, a compression plate 2. The breast to be radiographed is pressed between the compression plate 2 cassette table with an edge of the cassette retainer 4, 4″ of the invention shown mounted thereon and the cassette table 3 equipped with a cassette. The cassette table 3 has, for the attaching of the cassette, the movable cassette retainer 4, 4′, against which the back edge of the cassette is placed. As noted, the front edge of the loaded cassette will be in contact with the body of the patient during examination to assure inclosing of the full mammary gland. In FIG. 1, the cassette retainer is depicted in tow different positions, position 18×24 (4) and position 24×30 (4′). The cassette holder according to the present invention has been arranged so that when the cassette retainer 4, 4′ is being moved, the retaining edges of the cassette table will at the same time be widened or narrowed to the desired size by a mechanism in the holder while the front edge of table remains constant.

FIG. 2A depicts a plan view of a cassette holder according to the invention, drawn so that the outlines of all parts are visible. In FIG. 2A the cassette holder is shown in size 18×24 and FIG. B in size 24×30. In the mechanism according to this embodiment, the upper part 4 of the cassette retainer is on top of metal plate 8. The cassette retainer 4 is attached by means of pins 7 to metal plate 8, which has oblong holes 9 along which the pins 7 can travel. The metal plate is attached to a frame 10. The metal plate 8 has on its front edge an aperture, not shown in the figure, for the sensor of the automatic exposure mechanism. The cassette retainer also includes a lower part 4″, which is connected to the upper part 4 by mediation of the pins 7. In the central oblong hole 9 there is a cassette-retainer locking means (not shown in the figure), comprising a T-piece which, when parallel to the hole, allows movement and, when perpendicular to the hole, locks the cassette retainer in place. To the lower part 4″ of the cassette retainer there are connected rolls 5, 5′. The cassette-retainer rolls 5, 5′ travel in slots 11, 11′ formed in identical parts 12, which are on opposite sides of the holder and for their part are attached to the edges 13 (only one of them is shown in the figure) lying outside the outer periphery of frame 10 the holder. To the frame part there are attached rolls 14, which travel along transverse slots 15 formed in the parts 12. The parts 6 additionally shown in the figure constitute a plastic casing between the cassette retainer and the metal plate 8. A plastic casing is more comfortable against the skin than is a plain metal plate.

When the cassette retainer 4, seen in FIG. 2B at the top of the cassette holder, is pulled downward and the pins 7 move in the slots 9, the rolls 5, 5' in the oblique slots 11, 11' will move in the identical parts 12 and pull the parts 12 against each other, whereby the entire cassette holder is narrowed to the position shown in FIG. 2A.

Figure 3:
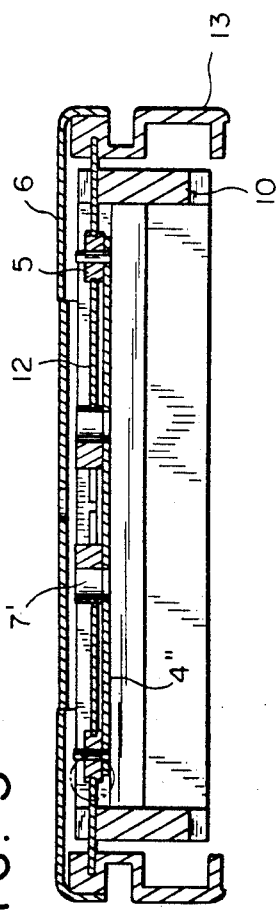
FIG. 3 depicts a cross-section of a cassette holder according to the invention, as seen from the end.

FIG. 3 depicts a cross section of a cassette holder according to the invention, in size 18×24 at the pins 7 of the cassette retainer. The pins 7 engage holes 7'. The figure shows the holder edges 13, to which the leaded plate is attached under the holder. To the frame 10 of the holder there are attached identical parts 12. The rolls 5 travel along oblique slots 11 in these parts.

Figure 4B:
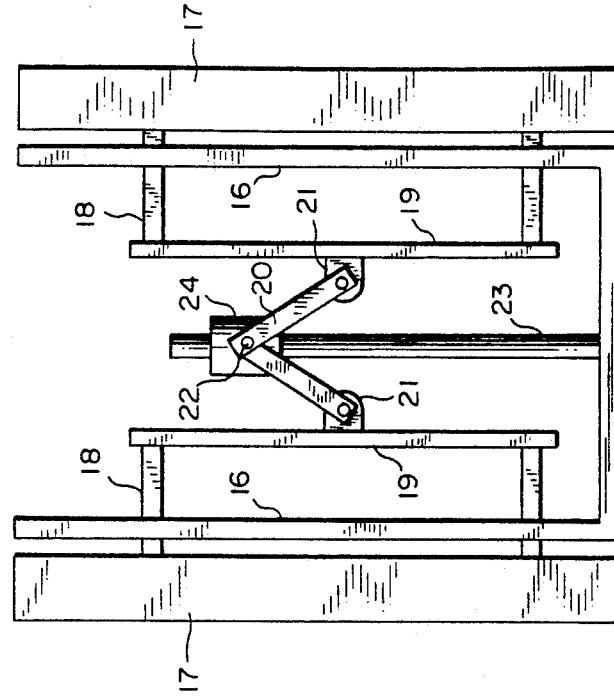
FIGS. 4A and 4B depicts a plan view of the mechanism of another embodiment of the cassette holder according to the invention with FIG. 4A holding a 24×30 cassette and FIG. 4B holding a 18×24 cassette.
Figure 4A:
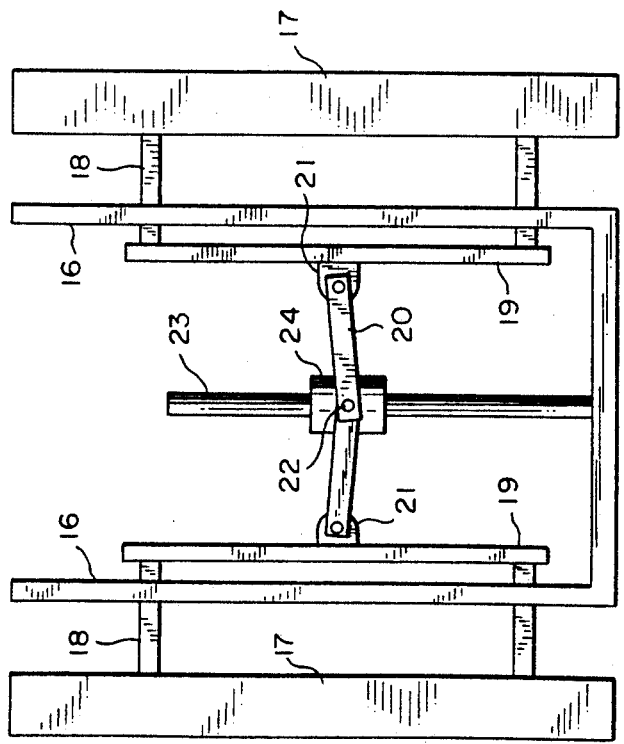

FIGS. 4A and 4B depicts another embodiment of the extending mechanism of the cassette holder according to the invention. In FIG. 4A the holder is shown in size 24×30 and in FIG. 4B in size 18×24. The extending mechanism comprises a rod 23 attached to the frame 16 half-way between the edges 17 of the cassette holder and parallel to them, there being a part 24 which slides along the rod being mounted on the rod. To this sliding part 24 there are connected arms 20 pivoted by means of a pin 22. By one end these arms 20 are attached by means of pins 21 to beams 19 parallel to the edges 17 of the cassette holder, the beams for their part being connected by means of fixed arms 18 to the edges 17 lying outside the outer periphery of frame 16 of the holder. The sliding part 24 can be attached to the cassette retainer, in which case, when the cassette retainer is moved, the sliding part 24 will slide along the rod 23, the arms 20 will pivot and move the edges 17 of the holder towards each other or away from each other.

We claim:

1. A cassette holder for use with mammography apparatus to permit insertion of differently sized cassettes, said holder comprising:
   a base frame (10, 16);
   an opening on a periphery of a plane of said holder for insertion of said differently sized cassettes;
   a cassette retainer (4, 4") located on said base frame and said plane of said holder, spaced away from said opening;
   said retainer (4, 4") being slidable longitudinally on said base frame (10,16);
   edge parts (13, 17) for engaging a cassette, slidable laterally on said base frame (10, 16);
   means connecting said retainer and said edge parts for laterally moving said edge parts when said retainer is moved longitudinally on said base frame by insertion of a cassette into said opening;
   wherein, said retainer and said edge parts are adjusted to engage said differently sized cassettes by moving said cassette retainer while aligning an edge of said opening with a corresponding edge of an inserted cassette to permit said edge of said opening and said corresponding edge of said inserted cassette to contact a body of a patient being examined.

2. A cassette holder according to claim 1, wherein,
   said cassette retainer (4, 4") has an upper portion (4) and a lower portion (4") connected by pins (7);
   said pins (7) are slidably engaged in oblong holes (9) on a metal surface (8) of said base frame (10);
   said lower portion (4") has first rollers (5, 5');
   side members (12) are engaged to said edge parts;
   said side members have oblong slots (11, 11');
   said first rollers (5, 5') on said lower portion (4") are rotatably engaged in said oblong slots (11, 11'); and
   said base frame (10) has second rollers (14) which are rotatably engaged in transverse slots (15) on said side members (12).

3. A cassette holder according to claim 1, wherein,
   said base frame (16) has a rod (23) mounted along the longitudinal axis of said base frame (16);
   a sliding connector (24) is slidably mounted on said rod (23);
   said cassette retainer (4, 4") is engaged to said sliding connector (24);
   a first end of each of two arms (20) are pivotedly engaged to said sliding connector (24);
   a second end of each of said two arms (20) are pivotedly engaged to each of two beams (19); each of said two beams being parallel to the longitudinal axis of said base frame (16);
   each of said two beams (19) being respectively engaged through said base frame (16) to each of said edge parts.

4. A cassette holder for use with mammography apparatus to permit insertion of differently sized cassettes said holder comprising:
   a base frame (10, 16);
   a cassette retainer (4, 4") located on said base frame;
   said retainer (4, 4") being slidable longitudinally on said base frame (10, 16);
   edge parts (13, 17) for engaging a cassette, slidably laterally on said base frame (10, 16);
   means connecting said retainer and said edge parts for laterally moving said edge parts when said retainer is moved longitudinally on said base frame;
   wherein, said means for laterally moving said edge parts comprises:
   an upper portion (4) and a lower portion (4") of aid cassette retainer (4, 4") being connected by pins (7);
   said pins (7) being slidably engaged in oblong holes (9) on a metal surface (8) of said base frame (10);
   said lower portion (4") having first rollers (5, 5');
   side members (12) being engaged to said edge parts;
   said side members having oblong slots (11, 11');
   said first rollers (5, 5') on said lower portion (4") being rotatably engaged in said oblong slots (11, 11'); and
   said base frame (10) having second rollers (14) which are rotatably engaged in transverse slots (15) on said side members (12);
   wherein, said holder can be widened or narrowed to engage differently sized cassettes by moving said cassette retainer.

5. A cassette holder for use with mammography apparatus to permit insertion of differently sized cassettes, said holder comprising:
   a base frame (10, 16);
   a cassette retainer (4, 4") located on said base frame;
   said retainer (4, 4") being slidable longitudinally on said base frame (10, 16);
   edge parts (13, 17) for engaging a cassette, slidable laterally on said base frame (10, 16);
   means connecting said retainer and said edge parts for laterally moving said edge parts when said retainer is moved longitudinally on said base frame;
   wherein, said means for laterally moving said edge parts comprises:

a rod (23) mounted along the longitudinal axis of said base frame (16);

a sliding connector (24) slidably mounted on said rod (23);

said cassette retainer (4, 4") being engaged to said sliding connector (24);

a first end of each of two arms (20) being pivotedly engaged to said sliding connector (24);

a second end of each of said two arms (20) being pivotedly engaged to each of two beams (19);

each of said two beams being parallel to the longitudinal axis of said base frame (16);

each of said two beams (19) being respectively engaged through said base frame (16) to each of said edge parts.

wherein, said holder can be widened or narrowed to engage differently sized cassettes by moving said cassette retainer.

* * * * *